United States Patent
Kakimi (10) Patent No.: US 12,027,735 B2
(45) Date of Patent: Jul. 2, 2024

(54) FUEL CELL SYSTEM

(71) Applicants: KABUSHIKI KAISHA TOYOTA JIDOSHOKKI, Kariya (JP); TOYOTA JIDOSHA KABUSHIKI KAISHA, Toyota (JP)

(72) Inventor: Yosuke Kakimi, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 17/528,459

(22) Filed: Nov. 17, 2021

(65) Prior Publication Data

US 2022/0166035 A1    May 26, 2022

(30) Foreign Application Priority Data

Nov. 20, 2020   (JP) ................................ 2020-193452
Jan. 27, 2021   (JP) ................................ 2021-011555

(51) Int. Cl.
  H01M 8/04858   (2016.01)
  H01M 8/04225   (2016.01)
  H01M 8/04537   (2016.01)
  H01M 10/48     (2006.01)
  H01M 16/00     (2006.01)

(52) U.S. Cl.
  CPC ..... H01M 8/0488 (2013.01); H01M 8/04225 (2016.02); H01M 8/04559 (2013.01); H01M 8/04567 (2013.01); H01M 10/48 (2013.01); H01M 16/006 (2013.01)

(58) Field of Classification Search
  CPC ........... H01M 8/0488; H01M 8/04225; H01M 8/04559; H01M 8/04567; H01M 10/48; H01M 16/006
  See application file for complete search history.

(56) References Cited

U.S. PATENT DOCUMENTS

| 2016/0133959 A1* | 5/2016 | Kwon | H01M 8/0488 |
| | | | 324/426 |
| 2016/0141905 A1* | 5/2016 | Yamanaka | H01M 8/0488 |
| | | | 320/135 |
| 2021/0111419 A1* | 4/2021 | Itou | B60L 58/12 |

FOREIGN PATENT DOCUMENTS

| JP | 2003-134691 A | | 5/2003 |
| JP | 2006246595 A | * | 9/2006 |
| JP | 2007-165082 A | | 6/2007 |
| JP | 2010-218691 A | | 9/2010 |
| JP | 2011-109776 A | | 6/2011 |

(Continued)

OTHER PUBLICATIONS

JP-2016095911-A—Machine Translation (Year: 2016).*
JP-2006246595-A—Machine Translation (Year: 2006).*

*Primary Examiner* — Brian R Ohara
*Assistant Examiner* — Patrick Marshall Greene
(74) *Attorney, Agent, or Firm* — Sughrue Mion, PLLC (57) ABSTRACT

A fuel cell system 1 includes a fuel cell FC having a plurality of fuel battery cells, a control unit Cnt configured to control power generation of the fuel cell FC, a power storage apparatus S, and a DCDC converter Cnv. The control unit Cnt makes the voltage of the fuel cell FC higher than the voltage of the power storage apparatus S when the power generation by the fuel cell FC is stopped and makes the power generated in the fuel cell FC when the power generation by the fuel cell FC is stopped chargeable to the power storage apparatus S through a first path having diodes D1, D3, D5.

14 Claims, 6 Drawing Sheets

(56) References Cited

FOREIGN PATENT DOCUMENTS

| JP | 5308268 B2 | 10/2013 |
| JP | 2016-095911 A | 5/2016 |
| JP | 2020-205168 A | 12/2020 |

* cited by examiner

FUEL CELL SYSTEM

CROSS-REFERENCE TO RELATED APPLICATIONS

This application is based upon and claims the benefit of priority from the prior Japanese Patent Application No. 2021-11555 filed on Jan. 27, 2021 and Japanese Patent Application No. 2020-193452 filed on Nov. 20, 2020, and the entire contents of which are incorporated herein by reference.

FIELD

The present invention relates to a fuel cell system.

BACKGROUND

A fuel cell system exists that is equipped with a step-up converter (DCDC converter) that converts the voltage of the fuel cell stack to a prescribed voltage and a power storage apparatus that is connected between the step-up converter and a load. By using a configuration in which the voltage of the fuel cell stack is boosted by the step-up converter, it becomes possible to reduce the number of fuel battery cells that constitute the fuel cell stack and to configure the fuel cell system at a low cost. For example, a fuel cell system in which the voltage output from the fuel cell stack is boosted by a step-up type DCDC converter has been disclosed.

Related arts include Japanese Patent No. 5308268.

However, when the configuration is made such that the voltage of the fuel cell stack is boosted by the step-up converter, the number of fuel battery cells may become too small when the number of fuel battery cells is adjusted so that the voltage of the fuel cell stack becomes smaller than the voltage of the power storage apparatus. As a result, the output of the fuel cell stack may become insufficient, and the fuel cell system may not be viable. Therefore, it is necessary to secure a necessary and sufficient number of fuel battery cells.

Meanwhile, in a fuel cell system, as the current output from the fuel cell stack decreases, the voltage of the fuel cell stack increases, and as a result of the voltage of the fuel cell stack exceeding a threshold, the fuel cell stack may deteriorate. Therefore, in a fuel cell system, the voltage of the fuel battery cells that constitute the fuel cell stack needs to be reduced by drawing current to the power storage apparatus to charge power so that the voltage does not exceed a prescribed value.

However, when the voltage of the fuel cell stack becomes higher than the voltage at which the power storage apparatus is able to tolerate charging, it is difficult to avoid a high potential because it is impossible to draw the current of the fuel cell stack any more.

SUMMARY

An objective of one aspect of the present invention is to provide a fuel cell system with which it is possible to avoid a high potential and also to improve the output of the fuel cell system.

A fuel cell system according to an embodiment of the present invention includes a fuel cell stack having a plurality of fuel battery cells; a controller that controls power generation of the fuel cell stack; a secondary battery; and a step-up converter having a first path having diodes. The controller makes the voltage of the fuel cell stack higher than the voltage of the secondary battery when power generation by the fuel cell stack is stopped and makes the power generated in the fuel cell when power generation is stopped chargeable to the secondary battery through the first path. Accordingly, it becomes possible in the system to perform a high potential with at least one of the first path or a second path when the voltage of the fuel cell stack becomes higher than the secondary battery and to secure the necessary and sufficient number of cells of the fuel cell stack, making it possible to improve the output of the fuel cell system.

DESCRIPTION OF EMBODIMENTS

Hereinafter, embodiments are described in detail according to the drawings.

First Embodiment

Figure 1:
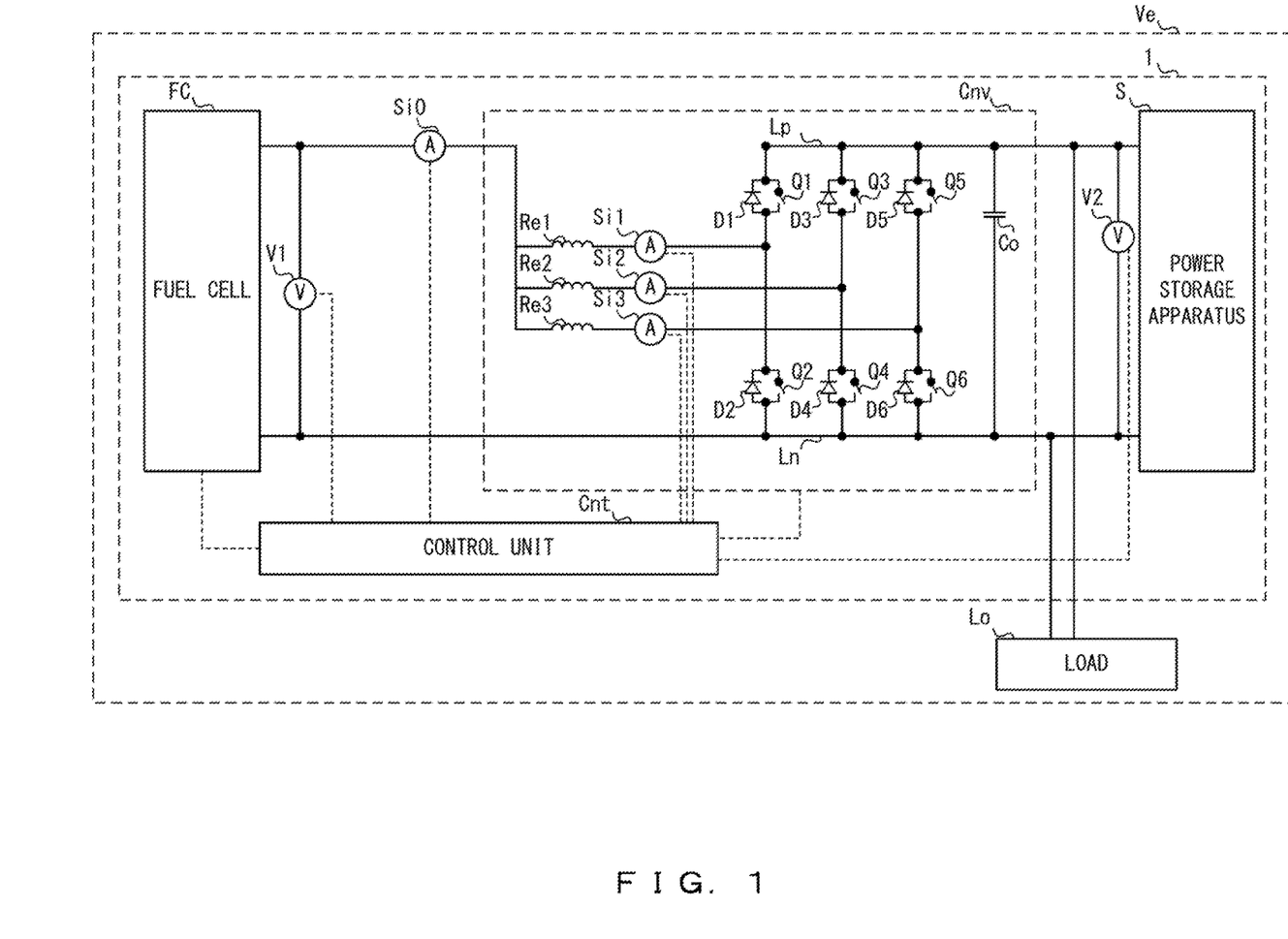
FIG. 1 illustrates an example of a fuel cell system according to the first embodiment of the present invention.

FIG. 1 illustrates an example of a fuel cell system according to the first embodiment of the present invention.

A fuel cell system 1 illustrated in FIG. 1 is installed in a vehicle Ve which is an industrial vehicle such as a forklift and the like or an electric vehicle and supplies electric power to a load Lo. The load Lo is a power supply or the like for supplying power to a driving motor, an electrical component, a computer, a memory, and so on. In addition to vehicles, the fuel cell system may also be applied to stationary emergency generators and the like.

Meanwhile, the fuel cell system 1 is equipped with a fuel cell FC, a current detecting unit Si0 (current detector), voltage detecting units V1 and V2, a DCDC converter Cnv, a power storage apparatus (secondary battery) S, and a control unit (controller) Cnt.

The DCDC converter Cnv is connected between the fuel cell FC and the power storage apparatus S. The DCDC converter Cnv is equipped with reactors Re1, Re2, Re3, current detecting units Si1, Si2, Si3, six switching elements Q1 through Q6, six diodes D1 through D6, and a capacitor Co. The fuel cell FC is connected to the six switching elements (switching semiconductor) Q1 through Q6 and the six diodes D1 through D6 via the reactors Re1, Re2, Re3 and the current detecting units Si1, Si2, Si3. The current detecting unit Si0 is connected between the fuel cell FC and the reactors Re1, Re2, Re3. MOSFETs (metal-oxide-semiconductor field-effect transistors) are used as the switching elements Q1 through Q6. However, as the switching elements, IGBTs (Insulated Gate Bipolar Transistors) or the like may also be used. The six diodes D1 through D6 are parasitic diodes of the six switching elements (MOSFETs) Q1 through Q6, respectively.

Between a positive bus bar Lp and a negative bus bar Ln, the switching element Q1 that constitutes the upper arm of phase u and the switching element Q2 that constitutes the lower arm of phase u are connected in series. Between the positive bus bar Lp and the negative bus bar Ln, the switching element Q3 that constitutes the upper arm of phase v and the switching element Q4 that constitutes the lower arm of phase v are connected in series. Between the positive bus bar Lp and the negative bus bar Ln, the switching element Q5 that constitutes the upper arm of phase w and the switching element Q6 that constitutes the lower arm of phase w are connected in series.

The power storage apparatus S is connected to the positive bus bar Lp and the negative bus bar Ln via the capacitor Co.

By configuring the DCDC converter Cnv with MOSFETs and parasitic diodes of the MOSFETs, it becomes possible to make the configuration of the DCDC converter Cnv with a simpler configuration than with a configuration with a mechanical switch or the like and to make the fuel cell system 1 small.

The path through which the power supplied from the fuel cell FC passes the diodes D1, D3, D5, or D2, D4, D6 is hereinafter referred to as the "first path." Meanwhile, the path through which the power supplied from the fuel cell FC passes the switching devices Q1, Q3, Q5, or Q2, Q4, Q6 is hereinafter referred to as the "second path."

The switching element Q1 that constitutes the upper arm of the u-phase, the switching element Q3 that constitutes the upper arm of the v-phase, and the switching element Q5 that constitutes the upper arm of the w-phase are connected to the load Lo via the positive bus bar Lp. The switching element Q2 that constitutes the lower arm of the u-phase, the switching element Q4 that constitutes the lower arm of the v-phase, and the switching element Q6 that constitutes the lower arm of the w-phase are connected to the load Lo via the negative bus bar Ln.

According to the switching operation of the switching elements Q1 through Q6 that constitute the upper and lower arms, the DC voltage that is the voltage of the power storage apparatus S is supplied to the load Lo. The load Lo is, for example, a motor for driving a vehicle or a motor for cargo handling.

The gate terminal of each switching element Q1 through Q6 is connected to the control unit Cnt. The control unit Cnt makes the switching elements Q1 through Q6 of the DCDC converter Cnv perform the switching operation according to the pulse pattern that is a control signal CS.

The three-phase DCDC converter Cnv converts the voltage of the fuel cell FC to a constant voltage by turning on and off the switching elements Q1 through Q6 according to the input control signal CS and outputs it to the load Lo and the power storage apparatus S.

The reactor Re1 is connected between the current detecting unit Si0 and the section between the switching element Q1 and the switching element Q2. The reactor Re2 is connected between current detecting unit Si0 and the section between the switching element Q3 and the switching element Q4. The reactor Re3 is connected between the current detecting unit Si0 and the section between the switching element Q5 and the switching element Q6.

The current detecting unit Si1 is connected between the reactor Re1 and the section between the switching element Q1 and the switching element Q2. The current detecting unit Si2 is connected between the reactor Re2 and the section between the switching element Q3 and the switching element Q4. The current detecting unit Si3 is connected between the reactor Re3 and the section between the switching element Q5 and the switching element Q6.

The fuel cell FC is a fuel cell stack that is configured with a plurality of fuel battery cells connected in series with each other and generates power using an electrochemical reaction between hydrogen and oxygen supplied according to the control by the control unit Cnt. The power storage apparatus S is configured with a lithium-ion capacitor or the like and is connected between the DCDC converter Cnv and the load Lo.

When the power output from the DCDC converter Cnv is larger than the power required by the load Lo, the surplus power is supplied to the power storage apparatus S and the power storage apparatus S is charged. Meanwhile, when the power output from the DCDC converter Cnv is less than the power required by the load Lo, the power storage apparatus S supplies the power corresponding to the shortage to the load Lo. In addition, when the regenerative power is supplied from the load Lo to the power storage apparatus S, the power storage apparatus S is charged. The power storage apparatus S is not limited to a lithium-ion capacitor, as long as it is a power storage apparatus (such as a lithium ion battery) that may be charged and discharged.

The current detecting unit Si0 is configured with an ammeter or the like and detects the current flowing from the fuel cell FC to the DCDC converter Cnv and outputs the detected current to the control unit Cnt.

The current detecting unit (current detector) Si1 is configured with an ammeter or the like and detects the current flowing through the switching element Q1 or the switching element Q2 to the DCDC converter Cnv, and outputs the detected current to the control unit Cnt.

The current detecting unit (current detector) Si2 is configured with an ammeter or the like and detects the current flowing through the switching element Q3 or the switching element Q4 to the DCDC converter Cnv and outputs the detected current to the control unit Cnt.

The current detecting unit (current detector) Si3 is configured with an ammeter or the like and detects the current flowing through the switching element Q5 or the switching element Q6 to the DCDC converter Cnv and outputs the detected current to the control unit Cnt. The voltage detecting unit (stack voltage detector) V1 is configured with a voltmeter or the like and detects the voltage of the fuel cell FC and outputs the detected voltage to the control unit Cnt. The voltage detecting unit (battery voltage detector) V2 is configured with a voltmeter or the like and detects the voltage of the power storage apparatus S and outputs the detected voltage to the control unit Cnt. The voltage of the fuel cell FC may be detected by directly measuring the voltage at both ends of the fuel cell FC, or by measuring the voltage of one representative cell among the fuel battery cells that constitute the fuel cell FC and multiplying the voltage by the number of stacked fuel battery cells. Alternatively, the cell voltage of one representative cell itself may be used. That is, any method will do as long as the voltage of the fuel cell is measured with necessary and sufficient accuracy. The same applies to the detection of the voltage of the power storage apparatus S.

The control unit Cnt is configured with a CPU (Central Processing Unit) or a programmable device (Field Programmable Gate Array: FPGA) or PLD (Programmable Logic Device) or the like and outputs the control signal CS. The control unit Cnt controls the amount of power generation (electric power) of the fuel cell FC by controlling the operation of the DCDC converter Cnv. That is, as the amount of fuel (hydrogen) or air (oxygen) supplied to the fuel cell FC increases, the amount of power generated by the fuel cell FC increases, and as the amount of fuel and air supplied to the fuel cell FC decreases, the amount of power generated by the fuel cell FC decreases. Meanwhile, the control unit Cnt may gradually increase or decrease the amount of fuel and air supplied to the fuel cell FC. It is supposed that when the amount of fuel and air supplied to the fuel cell FC is set to zero, the control unit Cnt stops power generation of the fuel cell FC and the amount of power generated by the fuel cell FC becomes zero after a prescribed period of time has passed. It is also supposed that the voltage of the fuel cell FC (fuel battery cells) decreases as the current output from the fuel cell FC increases, and that the voltage of the fuel cell FC (fuel battery cells) increases as the current output from the fuel cell FC decreases.

In addition, the control unit Cnt controls the operation of the DCDC converter Cnv so that the current corresponding to the power required by the load Lo and the power storage apparatus S is output from the fuel cell FC and so that the voltage of the fuel cell FC does not exceed a threshold. Meanwhile, the process of adjusting the current flowing to the DCDC converter Cnv so that the voltage of the fuel cell FC does not exceed the threshold and the fuel cell FC does not deteriorate is called a high potential avoidance process. In addition, it is assumed that the duty ratio of the control signal CS increases as the power demanded by the load Lo and the power storage apparatus S increases, and the duty ratio of the control signal CS decreases as the power demanded by the load Lo and the power storage apparatus S decreases. Meanwhile, the threshold is assumed as the voltage of the fuel cell FC at the time when there is a possibility that the fuel cell FC may be degraded, and when the voltage of the fuel cell FC is likely to exceed the threshold, the decrease in the duty ratio of the control signal CS is limited. In the fuel cell system 1, the voltage per cell of the fuel cell FC is set so that it does not exceed a first threshold voltage in order to perform high potential avoidance. This first threshold voltage is hereinafter referred to as the "high potential avoidance voltage."

In this embodiment, in order to create a low-cost fuel cell system 1, the configuration is made so that the number of cells constituting the fuel cell FC is reduced and the voltage of the fuel cell FC is boosted by a step-up type DCDC converter Cnv. The voltage of the fuel cell FC is set to satisfy the following Equation 1. The "voltage of the fuel cell FC" in Equation 1 below is the voltage at both ends of the fuel cell FC.

Voltage of the fuel cell FC≤High potential avoidance voltage×Number of cells   Equation 1

Since the DCDC converter Cnv is a step-up type, the number of cells is adjusted so that the voltage of the fuel cell FC is smaller than the voltage of the power storage apparatus S, so that the voltage of the fuel cell FC does not overlap with the voltage of the power storage apparatus S during normal operation, that is, when the current is drawn by the load Lo. However, if the voltage of the fuel cell FC is made too small, the number of cells becomes too small. As a result, the power output of the fuel cell FC will be insufficient, and the fuel cell system will not be viable.

Therefore, in this embodiment, in order to avoid a high potential and to improve the power output of the fuel cell system 1, the fuel cell system 1 is set so that the voltage of the fuel cell FC is higher than the voltage of the power storage apparatus S when the power generation by the fuel cell FC is stopped. Specifically, the power generation by the fuel cell FC is stopped when there is no more power required by the load Lo and the power storage apparatus S, and the number of cells is set so that the value of high potential avoidance voltage×number of cells is higher than the voltage of the power storage apparatus S. Meanwhile, the fuel cell system 1 is set so that the voltage of the fuel cell FC is lower than the voltage of the power storage apparatus S while the fuel cell FC is generating power. This makes it easy to control the DCDC converter Cnv because the timing at which the DCDC converter Cnv should operate becomes clear.

The control unit Cnt makes the power generated in the fuel cell FC when power generation is stopped chargeable to the power storage apparatus through at least one of the first path D1, D3, D5 or the second path Q1, Q3, Q5.

In this embodiment, the electric power generated in the fuel cell FC when the power generation is stopped refers to the power generated by the reaction of hydrogen and oxygen that remain in the fuel cell system 1 in the hydrogen and oxygen whose supply is reduced to zero according to the control of the control unit Cnt. Meanwhile, stopping the power generation by the fuel cell FC includes not only the case where the power generation by the fuel cell FC is completely reduced to zero, but also the case where the power generation by the fuel cell FC is suppressed and the power generation by the fuel cell FC becomes substantially close to zero. Therefore, when the power generation is stopped, the current of the fuel cell FC may be charged to the power storage apparatus S by letting the current flow toward the first path (diodes D1, D3, D5).

Meanwhile, in the fuel cell system 1, the voltage of the fuel cell FC is set so that it does not exceed a second threshold voltage in order to prevent the power storage apparatus S from becoming overcharged. This second threshold voltage is hereinafter referred to as the "power generation stop voltage." The power generation stop voltage is a value specific the fuel cell system 1. For example, the voltage at a prescribed percentage of the SOC (State Of Charge) of the power storage apparatus S (remaining power storage capacity) is used as the power generation stop voltage. When the voltage of the power storage apparatus S exceeds the power generation stop voltage, the power generation by the fuel cell FC is stopped. The number of cells in the fuel cell FC is determined by Equation 2 below. The "high potential avoidance voltage" in Equation 2 below is the voltage at both ends of the fuel cell FC.

Number of cells×High potential avoidance voltage=Power generation stop voltage+$Vf$   Equation 2

$Vf$ is a threshold voltage (rising voltage) for the losses due to the diodes D1, D3, D5. The voltage of the fuel cell FC is determined according to the number of cells×high potential avoidance voltage.

When the number of cells in the fuel cell FC is set so that Equation 2 is satisfied, it becomes possible to increase the number of cells in the fuel cell FC, and as a result, it becomes possible to increase the output of the fuel cell FC. Also, in the voltage (range) where the voltage of the fuel cell FC is smaller than the voltage of the power storage apparatus S, the voltage of the fuel cell FC may be lowered by performing high potential avoidance by simply letting the current flow in a natural manner.

When the current is being drawn by the load Lo, the voltage of the fuel cell FC decreases, so the DCDC converter Cnv boots the voltage of the fuel cell FC to output the desired voltage. When boosting the voltage, the DCDC converter Cnv turns off all the switching elements Q1, Q3, Q5 of the upper arm, and turns on and off the switching elements Q2, Q4, Q6 of the lower arm by shifting their phases.

When the current is not drawn by the load Lo, the control unit Cnt stops the power generation by the fuel cell FC. However, even when the power generation by the fuel cell FC is stopped, when no power is drawn by the load Lo, the voltage of the fuel cell FC will increase due to the power generated by the reaction of the residual fuel (hydrogen) and air (oxygen). Then, when the following Equation 3 is satisfied and the voltage of the fuel cell FC becomes higher than the voltage of the power storage apparatus S, it becomes impossible to boost the voltage by the DCDC converter Cnv. The "voltage of the fuel cell FC" in Equation 4 below is the voltage at both ends of the fuel cell FC.

Voltage of the fuel cell FC≥Voltage of the power storage apparatus $S$    Equation 3

Even if the state of Equation 3 is reached when power generation is stopped, by setting the number of cells as set in Equation 2, the current of the fuel cell FC may be charged to the power storage apparatus S so that the current flows toward the first path in a natural manner, to maintain the state in which the voltage of the cells of the fuel cell FC is equal to or below the high potential avoidance voltage. When letting the current flow in a natural manner, the DCDC converter Cnv turns off all the switching elements Q1, Q3, Q5 of the upper arm and the switching elements Q2, Q4, Q6 of the lower arm. When the relationship in Equation 3 is established, the current generated by the fuel cell FC flows through the diodes D1, D3, D5 of the upper arm to the power storage apparatus S.

Therefore, the characteristics of the diodes D1, D3, D5 of the upper arm that are parasitic diodes may be utilized to perform high potential avoidance in a natural manner. In addition, the overlap between the voltage of the fuel cell FC and the voltage of the power storage apparatus S may be tolerated, making it possible to increase the number of cells in the fuel cell FC and to increase the power output of the fuel cell FC.

In addition, when the number of cells is set so as to satisfy Equation 2, the state is determined in which it is possible to perform high potential avoidance without operating (i.e., without controlling) the step-up type DCDC converter Cnv while the output of the fuel cell FC is optimized. Therefore, it becomes possible to optimize the number of cells without complicating the control of the fuel cell system 1.

Thus, in the fuel cell system 1 according to the embodiment, when power generation by the fuel cell FC is stopped, the voltage of the fuel cell FC becomes higher than the voltage of the power storage apparatus S. Then, the fuel cell system 1 is configured so that the power generated in the fuel cell FC when power generation by the fuel cell FC is stopped is chargeable to the power storage apparatus S through at least one of the diodes D1, D3, D5 (the first path) or the switching elements Q1, Q3, Q5 (the second path).

As a result, by determining the number of cells so as to let the current flow in a natural manner toward the first path even when the power generation by the fuel cell FC is stopped, the control unit Cnt is able to make the current of the fuel cell FC chargeable to the power storage apparatus S when the current is not drawn by the load Lo. This makes it possible to perform high potential avoidance and to improve the power output of the fuel cell system.

Also, the control unit Cnt controls the DCDC converter Cnv so that the voltage of the fuel cell FC is lower than the voltage of the power storage apparatus S while the fuel cell FC is generating power. Specifically, when power requirement by the load Lo that is the load or by the power storage apparatus S occurs, the power generation by the fuel cell FC is started, and the control unit Cnt controls the DCDC converter Cnv to give the target current according to the required power requirement. This makes it easy to control the DCDC converter Cnv because the timing at which the DCDC converter Cnv should be operated becomes clear.

The control unit Cnt also sets the lowest voltage of the power generation voltage range of the fuel cell FC (the range of the lower-limit voltage and the upper-limit voltage in the control of the fuel cell FC) to a voltage that is lower than the lowest voltage of the usage voltage range of the power storage apparatus S (a range of voltages set from the lower SOC and upper SOC of the power storage apparatus S). This makes it possible to utilize the performance of the power storage apparatus S as much as possible.

In addition, the switching elements of the DCDC converter Cnv are configured with MOSFETs, and the diodes are configured with parasitic diodes of the MOSFETs. This makes it possible to make the configuration of the DCDC converter Cnv with a simpler configuration than a configuration made with mechanical switches or the like and to make the fuel cell system 1 small.

Second Embodiment

Next, a fuel cell system according to the second embodiment of the present invention is described.

As a background for the fuel cell system according to the second embodiment, a fuel cell system exists that determines an abnormality according to a voltage threshold of the fuel cell in order to determine the status of the fuel cell system. The fuel cell system is able to determine whether to start or not according to the determination result for a prescribed threshold value. based on the result of the judgment for a given voltage threshold.

A fuel cell system is disclosed that diagnoses whether or not it is possible to continue starting up the fuel cell system according to the determination result as to whether or not the voltage of the fuel cell has reached or exceeded a prescribed voltage threshold from immediately after hydrogen and air are supplied to the fuel cell.

Related arts include Japanese Laid-open Patent Publication No. 2007-165082.

Meanwhile, a fuel cell system exists that is equipped with a step-up converter (DCDC converter) that converts the voltage of the fuel cell to a prescribed voltage and a power storage apparatus that is connected between the step-up converter and a load. In the fuel cell system, by setting the number of fuel battery cells so that the voltage of the fuel cell becomes higher than the voltage of the power storage apparatus when power generation by the fuel cell is stopped and by making the power generated in the fuel cell when power generation is stopped chargeable to the power storage apparatus through a path by means of diodes provided in the step-up converter or the like, it becomes possible to optimize the power output of the fuel cell while performing high potential avoidance by a natural voltage-drop operation without engaging the step-up converter.

However, when a step-up converter is applied to a fuel cell system, the voltage of the fuel cell rises when air and hydrogen are supplied. However, the lower the voltage of the power storage apparatus connected to the secondary side of the step-up converter is, the larger the potential difference between the fuel cell and the power storage apparatus becomes, and therefore, a large current will flow in a natural manner, resulting in an air shortage against the current air supply. This causes the voltage of the fuel cell to drop. Therefore, when the determination as to whether to start the system is made according to a threshold value for the voltage of the fuel cell, it may not be possible to start the fuel cell system. An objective of one aspect of the present invention is to provide a fuel cell system that is capable of determining an abnormality of the fuel cell system and starting it with certainty.

A fuel cell system according to an embodiment of the present invention includes a fuel cell that generates power with hydrogen gas and oxidant gas; a step-up converter; a power storage apparatus; a voltage sensor that measures the voltage of the power storage apparatus; and a control unit that controls the control mode of the fuel cell. The control mode includes a start sequence in which a determination is made as to whether the voltage of the fuel cell reaches the start-up threshold voltage while the hydrogen gas and the oxidant gas react; and a power generation sequence to which transition is made after the voltage of the fuel cell reaches the start-up threshold voltage. The control unit determines whether or not to transition from the start sequence to the power generation sequence and calculates the start-up threshold voltage according to the voltage of the power storage apparatus.

This makes it possible to set an appropriate start-up threshold voltage for determining an abnormality of the fuel cell system in the start sequence, as well as to start up the fuel cell system with certainty by changing the transition condition for the start-up voltage threshold of the fuel cell for transitioning to the power generation sequence, making it possible to cause the transition to the power generation sequence.

Hereinafter, the second embodiment is described in detail according to the drawings.

The fuel cell system according the second embodiment is almost identical to the fuel cell system according to the first embodiment described in FIG. 1, and therefore, explanations of common configurations are omitted.

Mode Control

Figure 2:
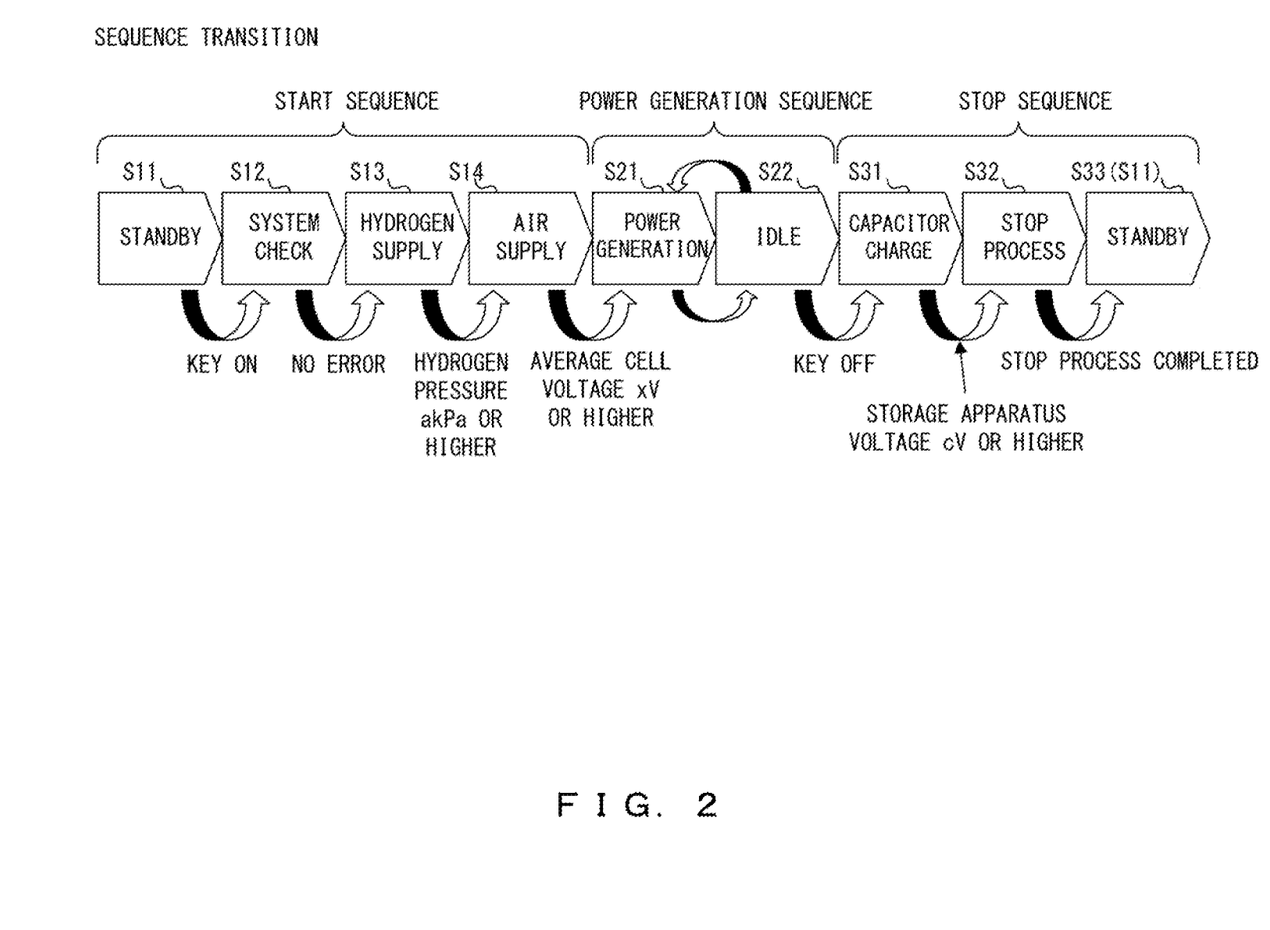
FIG. 2 illustrates the transition states of the control mode of a fuel cell system.

FIG. 2 illustrates the transition states of the control mode of the fuel cell system according the second embodiment. The control unit Cnt of the fuel cell system 1 controls the control mode of the fuel cell FC. The control mode has at least a start sequence and a power generation sequence. The control mode further includes a stop sequence. The control mode of the fuel cell FC may also have other sequences.

In the start sequence, mainly a process is performed to determine whether or not there is an abnormality in the fuel cell system 1. In the start sequence, processes including standby, system check, hydrogen supply, and air supply are performed. In the standby (sleep) (S11) state, when the operator performs key ON, the fuel cell system 1 starts up, and the control unit Cnt performs the system check (S12) process to see if there is an error in the system. In the case in which there is no error as a result of the system check, then after the system check, the control unit Cnt performs the hydrogen supply (S13) process. In the hydrogen supply process, the hydrogen stored in the hydrogen tank is supplied to the fuel cell FC through an injector.

When the hydrogen pressure of the fuel cell FC becomes higher than a prescribed threshold value akPa with the supplied hydrogen, the control unit Cnt moves to the air supply (S14) process, assuming that the hydrogen supply is completed. In the process of air supply, air is supplied to the fuel cell FC through an air compressor at a flow rate of bNL/min (hereinafter, also referred to as "air flow rate").

When hydrogen and oxygen are supplied into the fuel cell FC, the voltage of the fuel cell FC rises due to the chemical reaction, and the control unit Cnt determines whether the prescribed start-up threshold voltage has been exceeded. When the prescribed start-up threshold voltage is exceeded, the start sequence is terminated and the control mode transitions to the power generation sequence. The determination is made, for example, according to whether the average cell voltage of the fuel cell FC exceeds a start-up threshold voltage xV as the start-up threshold voltage.

Here, in the case in which the average cell voltage of the fuel cell FC fails to exceed the start-up threshold voltage xV even when a prescribed period of time has passed after the air is supplied, the process is held up at the air supply, and as a result, the sequence of the fuel cell system 1 cannot transition from the start sequence to the power generation sequence. Then, when a time out occurs as the state continues for a prescribed period of time or more in which the average cell voltage fails to exceed the start-up threshold voltage xV, it is determined that there is an abnormality in the fuel cell FC, and the control unit Cnt terminates the process of the fuel cell system 1 due to an error.

Since the step-up type DCDC converter Cnv equipped with the first path (parasitic diodes) is applied to the fuel cell system 1 in the present embodiment, there are cases when a large current flows into the first path as a natural course (for example, when the voltage of the power storage apparatus S is low), which leads to a shortage of air (hereinafter, also referred to as "air shortage") with respect to the current amount of air supply, and as a result, the voltage of the fuel cell FC becomes low. In the case in which a circuit configuration such as a switch is provided to shut off the current flowing in the first path, the air shortage in the fuel cell FC does not occur, but a separate circuit configuration must be provided, which increases the cost.

Therefore, a situation occurs in which it is impossible to make the average cell voltage equal to or higher than the start-up threshold voltage xV and it is impossible to transition from the start sequence to the power generation sequence. As a result, a situation occurs in which the fuel cell system 1 fails to start due to a timeout. In the present embodiment, shortage of air (air shortage) refers to the state in which the amount of air supplied is low with respect to the current that is currently flowing from the fuel cell FC.

In the case in which the voltage of the fuel cell FC is greater than the voltage of the power storage apparatus S, that is, the state of Equation 3 above, the current generated in the fuel cell FC flows through the diodes D1, D3, D5 to the power storage apparatus S in a natural manner. Therefore, when the fuel cell FC is short of air, the average cell voltage does not become equal to or higher than the start-up threshold voltage xV, and the sequence is halted as it fails to transition from the start sequence to the power generation sequence.

Meanwhile, for the air supply process in the start sequence, a fixed value is set because only the minimum amount is supplied that is necessary to blow off the water or the like that has accumulated in the fuel cell FC. If a large value is set for the fixed value and a large amount of air is supplied to solve the air shortage, the air shortage condition will be solved, but if excessive air is supplied from the time of starting up the fuel cell system 1, it will cause harmful effects such as noise generation and large power consumption due to the driving of the air compressor even when the system has not transitioned to the power generation sequence. In addition, in the case in which the key ON operation is repeatedly executed by the operator, a backlash occurs in which too much water is blown off in the fuel cell FC causing it to dry up, so the air flow rate is set as a fixed value where the minimum necessary amount is supplied by the air supply process.

Meanwhile, the start sequence is performed in order to perform a system check to check the fuel cell system 1 for any troubles at the time of starting up. That is, since the start sequence is a phase to determine whether or not there is an abnormality in the fuel cell system 1, the start-up threshold voltage xV to be set may be a fixed value to ensure the same conditions each time. Alternatively, the start-up threshold voltage xV to be set may be calculated according to a prescribed conditional formula.

When the sequence transitions from the start sequence to the power generation sequence, the control unit Cnt repeatedly executes the processes including power generation (S21) by the fuel cell FC and idle (S22) according to the load Lo's demand.

In the stop sequence, processes are performed including capacitor charge, a stop process, and standby. In the process of capacitor charge (S31), if the state of charge (SOC) of the power storage apparatus S is low when the operator performs key OFF, the power storage apparatus S is charged from the fuel cell FC to provide the necessary voltage for the next start-up. For example, in the capacitor charge process, the power storage apparatus S is charged until the voltage of the power storage apparatus S becomes equal to or higher than the threshold voltage cV required for the next start-up. The threshold voltage cV is set to a value higher than the start-up threshold voltage xV in the start sequence.

When the voltage of the power storage apparatus S is equal to or higher than the threshold voltage cV, the process of capacitor charge is terminated and the stop process (S32) is performed. In the stopping process, power generation by the fuel cell FC is stopped, and when the stopping process is completed, the system returns to the state of standby (S33). When the sequence returns to the standby state, the transition state of the sequence returns from the stop sequence to the start sequence.

Figure 3:
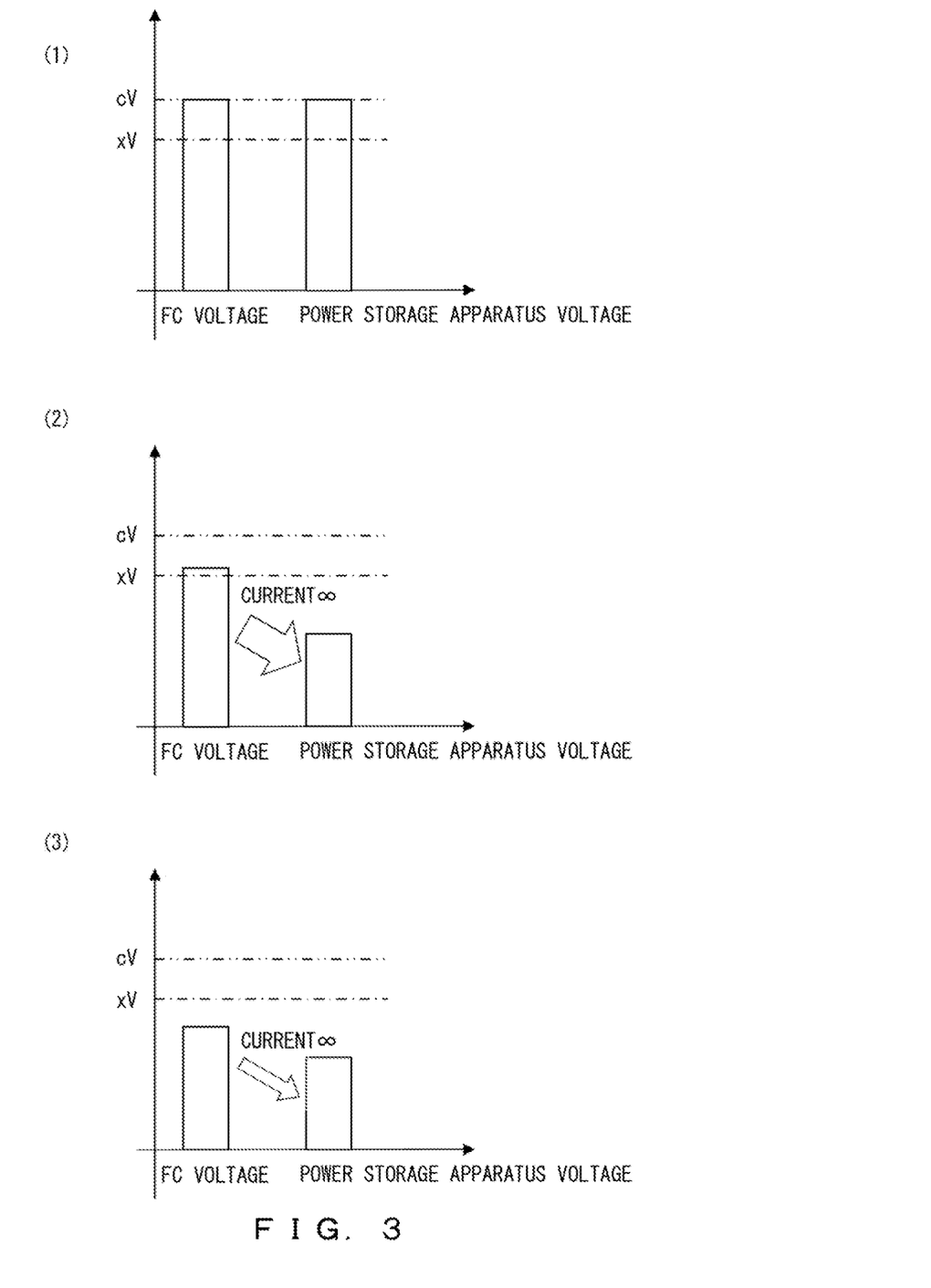
FIG. 3 illustrates the relationship between the voltage of a fuel cell FC and the voltage of a power storage apparatus S.

Next, referring to FIG. 3, the relationship between the voltage of the fuel cell FC and the voltage of the power storage apparatus S according to the second embodiment is described. FIG. 3 illustrates the relationship between the voltage of the fuel cell FC and the voltage of the power storage apparatus S according to the second embodiment.

In the normal start-up state, as shown in FIG. 3(1), the voltage of the power storage apparatus S is equal to or higher than the threshold voltage cV required for the next start-up, according to the process of capacitor charge (S31 in FIG. 2), so the start-up threshold voltage xV may be exceeded in the start sequence and the transition may be performed to the power generation sequence. However, in the case in which the fuel cell system is stopped due to an abnormality, such as an emergency stop, the system may enter the next start sequence without going through the stop sequence. In this case, the voltage of the power storage apparatus S is lower than the voltage of the fuel cell FC, and the potential difference is larger than usual, resulting in a current that is larger than usual flowing in the first path in a natural manner, as illustrated in FIG. 3(2). As a result, as illustrated in FIG. 3(3), the voltage of the fuel cell FC becomes low, causing a situation in which the start-up threshold voltage xV of the start sequence fails to be exceeded, making it impossible for the sequence to transition to the power generation sequence.

In the present embodiment, the abnormality of the fuel cell system 1 may be determined in the start process, and the transition condition of the start-up threshold voltage xV of the fuel cell FC for transitioning from the start sequence to the power generation sequence may be changed to make the fuel cell system 1 transition to the power generation sequence, thereby making it possible to start the fuel cell system 1 with certainty. In addition, after transitioning to the power generation sequence, in order to improve the air shortage situation of the fuel cell FC, the amount of air to be supplied may be increased to improve the air shortage.

The control unit Cnt may calculate the start-up threshold voltage xV in the start sequence according to the voltage of the power storage apparatus S. Specifically, the control unit Cnt calculates the start-up threshold voltage xV according to the Equation 4 below. The "voltage of the fuel cell FC" in Equation 4 below is the voltage at both ends of the fuel cell FC.

$$\text{Start-up threshold voltage } xV \times \text{Number of cells} \leq \text{Voltage of the fuel cell FC} + \alpha$$

$$\text{Start-up threshold voltage } xV \leq (\text{Voltage of the fuel cell FC } V + \alpha)/\text{Number of cells} \quad \text{Equation 4}$$

Here, α is the voltage V for the circuit loss caused by the DCDC converter Cnv and it depends on the configuration of the DCDC converter Cnv. When the start sequence starts, the control unit Cnt calculates the start-up threshold voltage xV according to Equation 4 and performs the process of lowering the start-up threshold voltage xV until Equation 4 is satisfied. The control unit Cnt may calculate the start-up threshold voltage xV at the time of starting up the fuel cell system 1. For example, the control unit Cnt may calculate the start-up threshold voltage xV according to Equation 4 at the timing when the start-up sequence starts from standby (S11) in FIG. 2 at the timing of key ON by the operator in the start sequence. The control unit Cnt may also calculate the start-up threshold voltage xV at any point before the transition from the start sequence to the power generation sequence. For example, the control unit Cnt may calculate the start-up threshold voltage xV in any of the processes (S11 through S14) of the start sequence in FIG. 2.

Meanwhile, the control unit Cnt may calculate the start-up threshold voltage xV when the transition from the start sequence to the power generation sequence has failed as the start-up threshold voltage xV has not been not met and a timeout occurred after a prescribed time elapsed. The control unit Cnt performs a determination process for transitioning from the start-up sequence to the power generation sequence according to the calculated start-up threshold voltage xV. In the case in which the voltage of the fuel cell FC is equal to or higher than the startup threshold voltage xV as a result of the determination process, the control unit Cnt makes the sequence of the fuel cell system 1 transition from the start sequence to the power generation sequence.

Here, in the case in which the start-up threshold voltage xV is calculated according to the voltage of the power storage apparatus S, that is, when the start-up threshold voltage xV is changed according to Equation 4, during the transition from the start-up sequence to the power generation sequence, the situation is such that the current flows from the fuel cell FC in a natural manner. Therefore, the normally set air flow rate causes shortage in the flow rate of the air supplied to the fuel cell FC. In this case, when the sequence has transitioned from the start sequence to the power generation sequence, the control unit Cnt performs, in the power generation sequence, a process to increase the flow rate of air (air flow rate) supplied to the fuel cell FC.

Specifically, the control unit Cnt calculates the flow rate of air to be supplied to the fuel cell FC (air flow rate) using Equation 5 below.

Air flow rate [NL/min]=(Target current×60)/(96500× Number of cells)/4/0.21×22.4×β          Equation 5

Here, β is the stoichiometry of the hydrogen and air to be supplied. The stoichiometry is the flow rate of air theoretically required for power generation in the fuel cell FC, calculated from the actual current of the fuel cell FC. For example, if the stoichiometric value is 1.0, the ratio of hydrogen to air (oxygen) that reacts in the fuel cell FC is 1. The higher the stoichiometry, the more air (oxygen) is available for reaction in the fuel cell FC. The stoichiometry may be set so that the amount of air is greater than the amount of hydrogen supplied. This allows the necessary and sufficient amount of air to be supplied to each cell of the fuel cell FC. The target current is the current that becomes the target voltage on the reference IV. The reference IV is a graph that depends on the performance of the fuel cell FC (cell).

Figure 4:
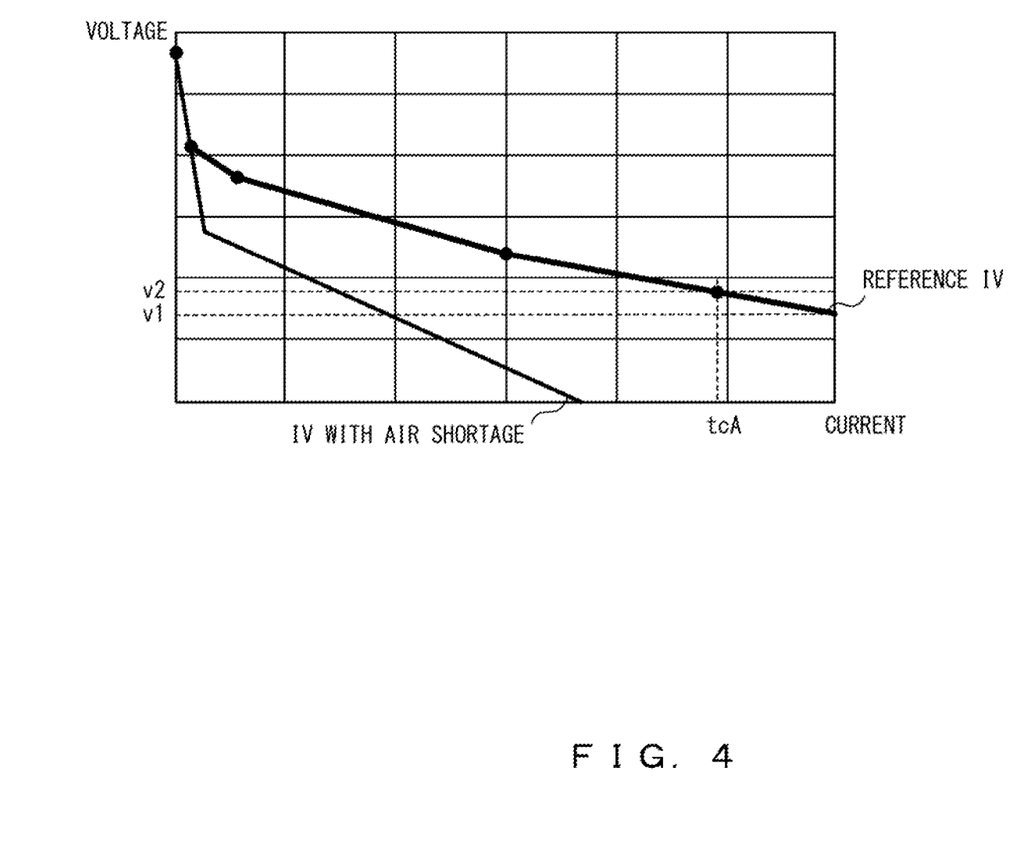
FIG. 4 is a graph illustrating an example of calculating a target voltage from a reference IV of a fuel cell FC.
Figure 5:
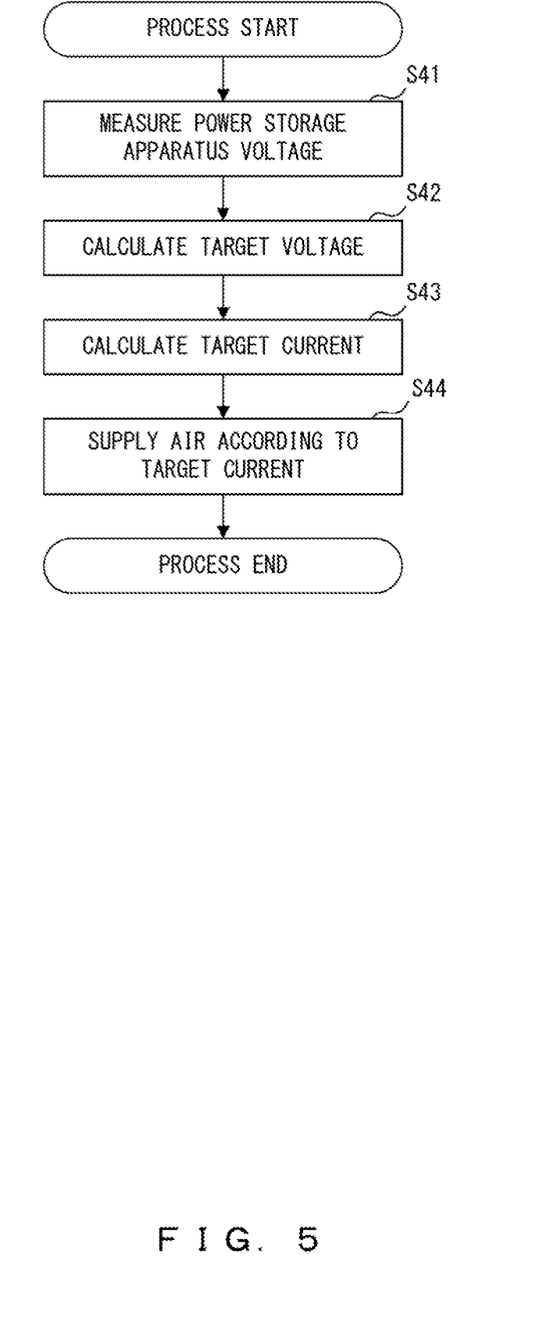
FIG. 5 is a flowchart for calculating a target voltage from a reference IV of a fuel cell FC.

Referring to FIG. 4 and FIG. 5, an example of calculating the target voltage from the reference IV of the fuel cell FC according to the second embodiment is explained. FIG. 4 illustrates an example of calculating the target voltage from the reference IV of the fuel cell FC according to the second embodiment. FIG. 5 is a flowchart for calculating the target voltage from the reference IV of the fuel cell FC according to the second embodiment. In the graph of FIG. 4, the horizontal axis represents the current of the fuel cell FC, and the vertical axis represents the voltage of the fuel cell FC.

The control unit Cnt measures the current voltage v1 of the power storage apparatus S (S41). Then, according to the measurement result, the voltage of the fuel cell FC is pulled up to the voltage obtained by subtracting a (the voltage V for circuit loss) from the current voltage v1 of the power storage apparatus S. For this reason, the control unit Cnt calculates a target voltage v2 as the value obtained by adding a to the voltage v1 of the power storage apparatus S (S42).

The control unit Cnt calculates, as the target current, the current that gives the target voltage v2 on the reference IV (S43). That is, the control unit Cnt calculates the target current tcA according to the point where the line of the reference IV and the target voltage v2 are tangent (see FIG. 4). According the calculated target current tcA, the control unit Cnt supplies air to the fuel cell FC so as to give the stoichiometry set in advance. When the air shortage has been resolved, the control unit Cnt may return the air supply to normal to make the state of the power generation sequence normal.

According to the above configuration, even in the case in which a step-up type DCDC converter Cnv is used in the fuel cell system 1, the abnormality of the fuel cell system may be determined in the start sequence, and by lowering the start-up threshold voltage xV, the transition from the start sequence to the power generation sequence may be made without causing an error, making it possible to start the fuel cell system with certainty.

Also, by calculating the start-up threshold voltage xV at the time of starting up the fuel cell system, it becomes possible to start the system fast.

In addition, after the control mode is transitioned from the start sequence to the power generation sequence, in order to improve the condition of the oxidant gas in the fuel cell FC, the amount of oxidant gas supplied may be increased to improve the oxidant gas shortage. That is, by supplying air that is stoichiometric according to the target current in the power generation sequence, it becomes possible to resolve the air shortage of the fuel cell FC and to stabilize the state of the fuel cell system 1.

Meanwhile, the present invention is not limited to the embodiments described above, and various improvements and changes may be made without departing from the gist of the present invention.

Other Embodiments

While the fuel cell system 1 described above is configured with a single phase of output, this is not a limitation. The fuel cell system 1 may be configured with three phases, namely u-phase, v-phase, w-phase, or it may be configured with a system of more than three phases.

Figure 6:
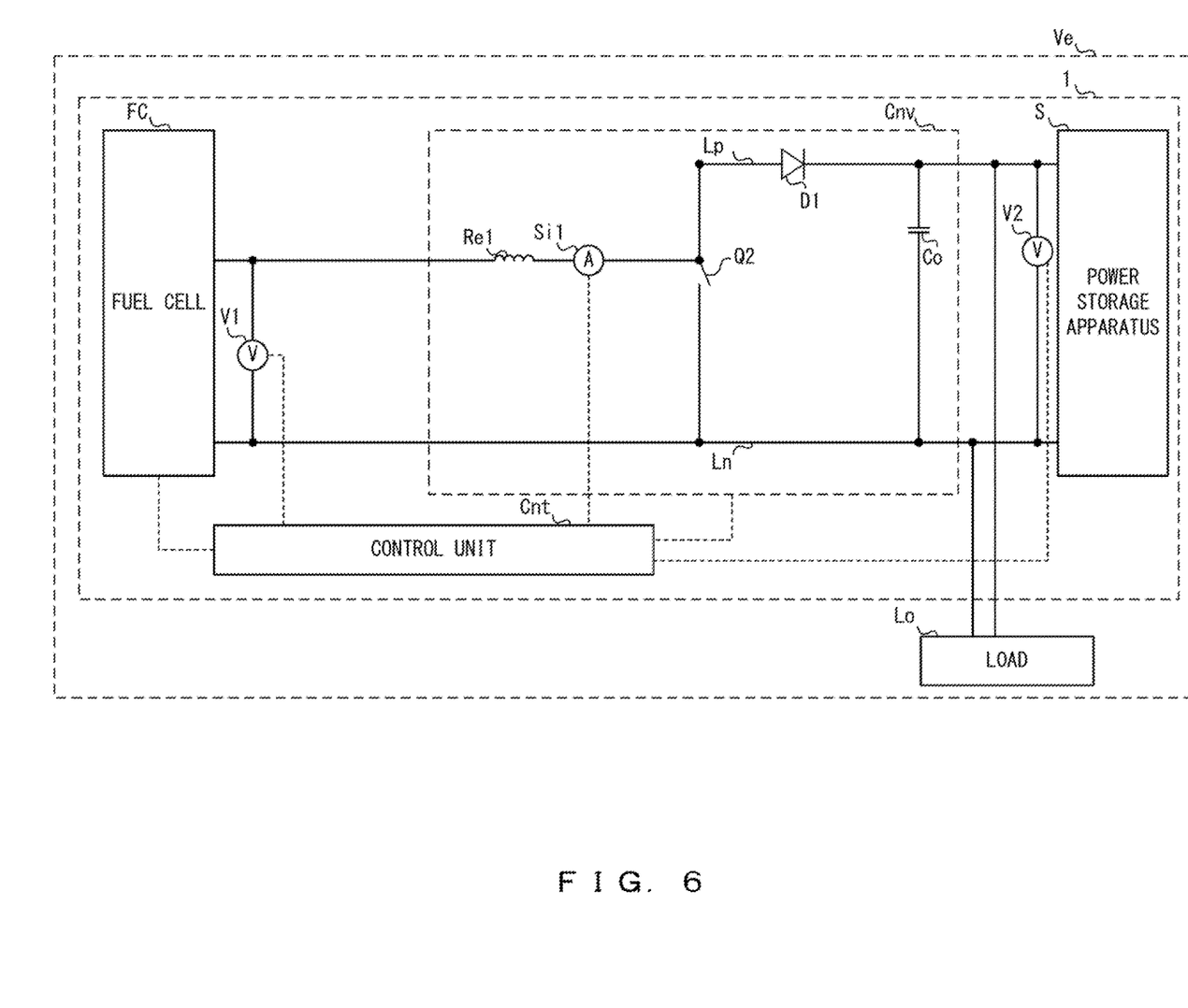
FIG. 6 illustrates an example of a fuel cell system according to another embodiment.

In addition, while the fuel cell system 1 described above is configured with a three-phase DCDC converter, this is not a limitation. The fuel cell system 1 may be a DCDC converter such as the one illustrated in FIG. 6. In this case, there is no second path with switching elements, but when power generation by the fuel cell FC is stopped, current flows through the first path with the diodes to perform high potential avoidance of the fuel cell FC.

In addition, while the number of cells in the fuel cell FC is determined by Equation 2 in the embodiments described above, this is not a limitation. For example, the voltage of the fuel cell FC may be higher than the voltage obtained by adding a threshold voltage (the rising voltage) of the diode to the voltage of the power storage apparatus S. In this case, the number of cells in the fuel cell FC is determined by Equation 6 below.

Number of cells×High potential avoidance voltage=Generation stop voltage          Equation 6

In addition, in the embodiments described above, when the current is let flow in a natural manner, the current is applied to diodes D1, D3, D5 in the upper arm, but this is not a limitation.

When the control unit Cnt detects that the voltage of the fuel cell FC detected by a voltage detection unit V1 is higher than the voltage of the power storage apparatus S detected by a voltage detection unit V2, the switching elements Q1, Q3, Q5 may be turned ON (closed state). Accordingly, even when the voltage of the fuel cell FC is higher than the voltage of the power storage apparatus S (the state of Equation 3 above), the current generated in the fuel cell FC flows through the switching elements Q1, Q3, Q5 to the power storage apparatus S. This eliminates the loss of power due to the diodes, and it becomes possible to efficiently charge the power output from the fuel cell FC to the power storage apparatus S.

In addition, the control unit Cnt may be configured to be able to detect the ON-OFF state (open/close state) of the switching elements Q1 through Q6. In the case in which the ON-OFF operations of the switching elements Q1 through Q6 are not performed and a current flowing in the first or second path is detected, the control unit Cnt makes the switching elements Q1 through Q6 enter the OFF state (closed state). As a result, even when the voltage of the fuel cell FC is higher than the voltage of the power storage apparatus S (the state of Equation 3 above), the current generated in the fuel cell FC flows through the switching elements Q1, Q3, Q5 to the power storage apparatus S. This eliminates the loss of power due to the diodes, and it becomes possible to efficiently charge the power output from the fuel cell FC to the power storage apparatus S.

What is claimed is:

1. A fuel cell system comprising:
a fuel cell stack having a plurality of fuel battery cells;
a controller configured to control power generation of the fuel cell stack;
a secondary battery;
a step-up converter having a first path having a diode; and
a switch that branches from a branching point of a positive bus and is arranged between the positive bus and a negative bus, wherein the diode is arranged on the power-storage-apparatus side of the branching point on the positive bus;
wherein
the controller is further configured to:
make a voltage of the fuel cell stack higher than a voltage of the secondary battery with the switch open, when power generation by the fuel cell stack is stopped; and
make a power generated in the fuel cell stack when the power generation is stopped chargeable to the secondary battery through the first path.

2. The fuel cell system according to claim 1, wherein the step-up converter has the first path having the diode and a second path having a switching semiconductor.

3. The fuel cell system according to claim 2, wherein the controller is further configured to perform control so that a voltage of the fuel cell stack becomes lower than a voltage of the secondary battery while the fuel cell stack is generating power.

4. The fuel cell system according to claim 3, wherein the controller is further configured to make a lowest voltage in a power generation voltage range of the fuel cell stack lower than a lowest voltage of a usage voltage range of the secondary battery.

5. The fuel cell system according to claim 2, wherein the switching semiconductor is a MOSFET, and the diode is a parasitic diode of the MOSFET.

6. The fuel cell system according to claim 1, wherein a voltage of the fuel cell stack in a state in which the power generation is stopped is configured to be higher than a voltage obtained by adding a threshold voltage of the diode to a voltage of the secondary battery.

7. The fuel cell system according to claim 2, further comprising
stack voltage detector for detecting a voltage of the fuel cell stack; and
battery voltage detector for detecting a voltage of the secondary battery,
wherein
the controller is further configured to, when the controller detects a voltage of the stack voltage detector being higher than a voltage of the battery voltage detector, make the switching semiconductor enter a closed state.

8. The fuel cell system according to claim 2, further comprising current detector for detecting a current flowing in the first path and the second path, wherein
the controller is further configured to detect an open/close state of the switching semiconductor, and
when the controller detects a current flowing in a case in which the switching semiconductor is not performing an opening/closing operation,
the controller is further configured to make the switching semiconductor enter a closed state.

9. The fuel cell system according to claim 1, wherein
a control mode of the fuel cell stack controlled by the controller comprises:
a start sequence in which a determination is made as to whether a voltage of the fuel cell stack reaches a start-up threshold voltage while hydrogen gas and oxidant gas react; and
a power generation sequence to which a transition is made after a voltage of the fuel cell stack reaches the start-up threshold voltage,
and
the controller is configured to
determine whether or not a transition is made from the start sequence to the power generation sequence; and
calculate the start-up threshold voltage according to a voltage of the secondary battery.

10. The fuel cell system according to claim 9, wherein
the controller is configured to perform calculation of the start-up threshold voltage at a time of starting up the fuel cell system.

11. The fuel cell system according to claim 9, wherein
the controller is configured to:
calculate a target current according to a voltage of the secondary battery after the transition is made from the start sequence to the power generation sequence; and
supply, with respect to an amount of oxidant gas corresponding to the target current, an amount that is larger than the amount of oxidant gas.

12. The fuel cell system according to claim 1, wherein an end of the diode is directly connected to the secondary battery.

13. The fuel cell system according to claim 1, wherein an end of the diode is connected to a current detector and a reactor.

14. The fuel cell system according to claim 13, further comprising a second diode connected to a second current detector and a second reactor.

* * * * *